United States Patent
He et al.

(10) Patent No.: US 11,582,436 B2
(45) Date of Patent: Feb. 14, 2023

(54) PASSIVE THREE-DIMENSIONAL IMAGE SENSING BASED ON CHROMATIC FOCAL DIFFERENTIATION

(71) Applicant: SHENZHEN GOODIX TECHNOLOGY CO., LTD., Shenzhen (CN)

(72) Inventors: Yi He, San Diego, CA (US); Bo Pi, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 85 days.

(21) Appl. No.: 17/369,915

(22) Filed: Jul. 7, 2021

(65) Prior Publication Data

US 2022/0021862 A1     Jan. 20, 2022

Related U.S. Application Data

(60) Provisional application No. 63/052,960, filed on Jul. 17, 2020.

(51) Int. Cl.
  *H04N 13/15*      (2018.01)
  *H04N 13/254*     (2018.01)
  *H04N 13/128*     (2018.01)

(52) U.S. Cl.
  CPC .......... *H04N 13/15* (2018.05); *H04N 13/128* (2018.05); *H04N 13/254* (2018.05)

(58) Field of Classification Search
  CPC ..... H04N 13/15; H04N 13/128; H04N 13/254

USPC .......................................................... 348/42
See application file for complete search history.

(56) References Cited

U.S. PATENT DOCUMENTS 9,497,397 B1     11/2016     Suppawan et al.

FOREIGN PATENT DOCUMENTS

| CN | 101142822 A | 3/2008 |
| CN | 101656835 A | 2/2010 |
| CN | 102984433 A | 3/2013 |
| CN | 105723239 A | 6/2016 |
| CN | 109564276 A | 4/2019 |
| CN | 110402397 A | 11/2019 |

*Primary Examiner* — Nguyen T Truong
(74) *Attorney, Agent, or Firm* — Kilpatrick Townsend & Stockton LLP

(57) ABSTRACT

Techniques are described for passive three-dimensional (3D) image sensing based on chromatic differentiation. For example, an object can be imaged by using a photodetector array to detect light reflected off of the object and focused through a lens onto the array. Light components of different wavelengths tends to be focused through the lens to different focal lengths, which can tend to impact the brightness of each wavelength as detected. For example, if the detector array is closer to a shorter-wavelength focal plane, a white spot will tend to be detected with a higher magnitude of blue light components than of red light components. Ratios of brightness magnitudes for different wavelengths vary in a manner that strongly correlates to object distance from the lens. Embodiments exploit this correlation to passively detect object distance. Some embodiments further provide various types of distance and/or chromatic calibration to further facilitate such detection.

20 Claims, 9 Drawing Sheets

PASSIVE THREE-DIMENSIONAL IMAGE SENSING BASED ON CHROMATIC FOCAL DIFFERENTIATION

CROSS-REFERENCES

This application claims the benefit of priority from U.S. Provisional Patent Application No. 63/052,960, titled "PASSIVE THREE-DIMENSIONAL IMAGE SENSING BASED ON CHROMATIC FOCAL DIFFERENTIATION", filed Jul. 17, 2020, which is hereby incorporated by reference in its entirety.

FIELD

The invention relates generally to optics integrated into personal electronic devices. More particularly, embodiments relate to passive three-dimensional image sensing based on chromatic focal differentiation, such as for depth mapping of a three-dimensional image space to support features of a smart phone camera system.

BACKGROUND

In the past, photography was a discipline reserved to those with specialized knowledge and equipment. Over the past decades, innovations in digital photographic hardware and software, and the worldwide spread of smartphones with integrated digital cameras, have placed digital photography at the fingertips of billions of consumers. In this environment of ubiquitous access to digital photography and videography, consumers increasingly desire to be able to quickly and easily capture moments using their smartphones. Advances in digital photography have included advances in capturing of three-dimensional information for various purposes. For example, capturing of depth and other three-dimensional information can support three-dimensional photography and videography, as well as advanced automation in focus, stabilization, aberration correction, and other features.

Depth information is typically captured using active techniques, such as time-of-fly techniques, or triangulation techniques. For example, focused light pulses can be transmitted, and their reflections can be subsequently received; and knowledge of various parameters (e.g., the speed of light) can be used to convert pulse receipt timing into a depth measurement. Conventionally, it has been difficult to integrate such time-of-fly and other techniques in portable digital electronics applications, such as smart phones. For example, some conventional approaches rely on separate optical systems, relatively large optics, and/or specialized illumination sources that do not fit within spatial limitations of many portable digital electronic applications; while other conventional approaches tend not to be reliable or accurate enough to support more advanced features.

BRIEF SUMMARY OF THE INVENTION

Embodiments provide passive three-dimensional (3D) image sensing based on chromatic focal differentiation, such as for depth mapping of a 3D image space to support features of a smart phone camera system. For example, an object can be imaged by using a photodetector array to detect light that has reflected off of the object, and been focused through a lens onto the array. Light components of different wavelengths tends to be focused through the lens to different focal lengths, which can tend to impact the brightness of each wavelength as detected. For example, if the detector array is closer to a shorter-wavelength focal plane, a white spot will tend to be detected with a higher magnitude of blue light components than of red light components. Ratios of brightness magnitudes for different wavelengths vary in a manner that strongly correlates to object distance from the lens. Embodiments exploit this correlation to passively detect object distance. Some embodiments further provide various types of distance and/or chromatic calibration to further facilitate such detection.

According to one set of embodiments, a passive three-dimensional imaging system is provided. The system includes: a lens assembly to receive light reflected off of a target scene object and to focus the received light, such that a smaller-wavelength component of the received light is focused to a target smaller-wavelength focal plane, and a larger-wavelength component of the received light is focused to a target larger-wavelength focal plane; an image sensor in optical communication with the lens assembly and comprising a plurality of photodetector elements, a first subset of the photodetector elements configured to produce a first set of chromatic responses to the smaller-wavelength component of the received light, and a second subset of the photodetector elements configured to produce a second set of chromatic responses to the larger-wavelength component of the received light; and a processor. The processor is configured to: receive raw image data from the image sensor indicating the first set of chromatic responses and the second set of chromatic responses; compute a first magnitude of chromatic response (MCR) from the first set of chromatic responses and a second MCR from the second set of chromatic responses; and determine an target object distance of the target scene object away from the lens assembly based on a ratio between the first MCR and the second MCR.

According to another set of embodiments, a method is provided for passive three-dimensional imaging. The method includes: receiving raw image data from an image sensor indicating a first set of chromatic responses and a second set of chromatic responses responsive to received light reflected off of a target scene object and focused by a lens onto the image sensor, such that a smaller-wavelength component of the received light is focused according to a target smaller-wavelength focal plane, and a larger-wavelength component of the received light is focused according to a target larger-wavelength focal plane, the first set of chromatic responses produced by the image sensor responsive the smaller-wavelength component of the received light, the second set of chromatic responses produced by the image sensor responsive to the larger-wavelength component of the received light; computing a first magnitude of chromatic response (MCR) from the first set of chromatic responses; computing a second MCR from the second set of chromatic responses; computing a MCR ratio as between the first MCR and the second MCR; and determining a target object distance of the target scene object away from the lens based on the MCR ratio.

According to another set of embodiments, a system is provided for passive three-dimensional imaging. The system includes one or more processors, and non-transient memory having instructions stored thereon, which, when executed by the one or more processors, cause the one or more processors to perform steps. The steps include: receiving raw image data from an image sensor indicating a first set of chromatic responses and a second set of chromatic responses responsive to received light reflected off of a target scene object and focused by a lens onto the image sensor, such that a smaller-wavelength component of the received light is focused according to a target smaller-wavelength focal plane, and a larger-wavelength component of the received light is focused according to a target larger-wavelength focal plane, the first set of chromatic responses produced by the image sensor responsive the smaller-wavelength component of the received light, the second set of chromatic responses produced by the image sensor responsive to the larger-wavelength component of the received light; computing a first magnitude of chromatic response (MCR) from the first set of chromatic responses; computing a second MCR from the second set of chromatic responses; computing a MCR ratio as between the first MCR and the second MCR; and determining a target object distance of the target scene object away from the lens based on the MCR ratio.

BRIEF DESCRIPTION OF THE DRAWINGS

The accompanying drawings, referred to herein and constituting a part hereof, illustrate embodiments of the disclosure. The drawings together with the description serve to explain the principles of the invention.

Figure 1A:
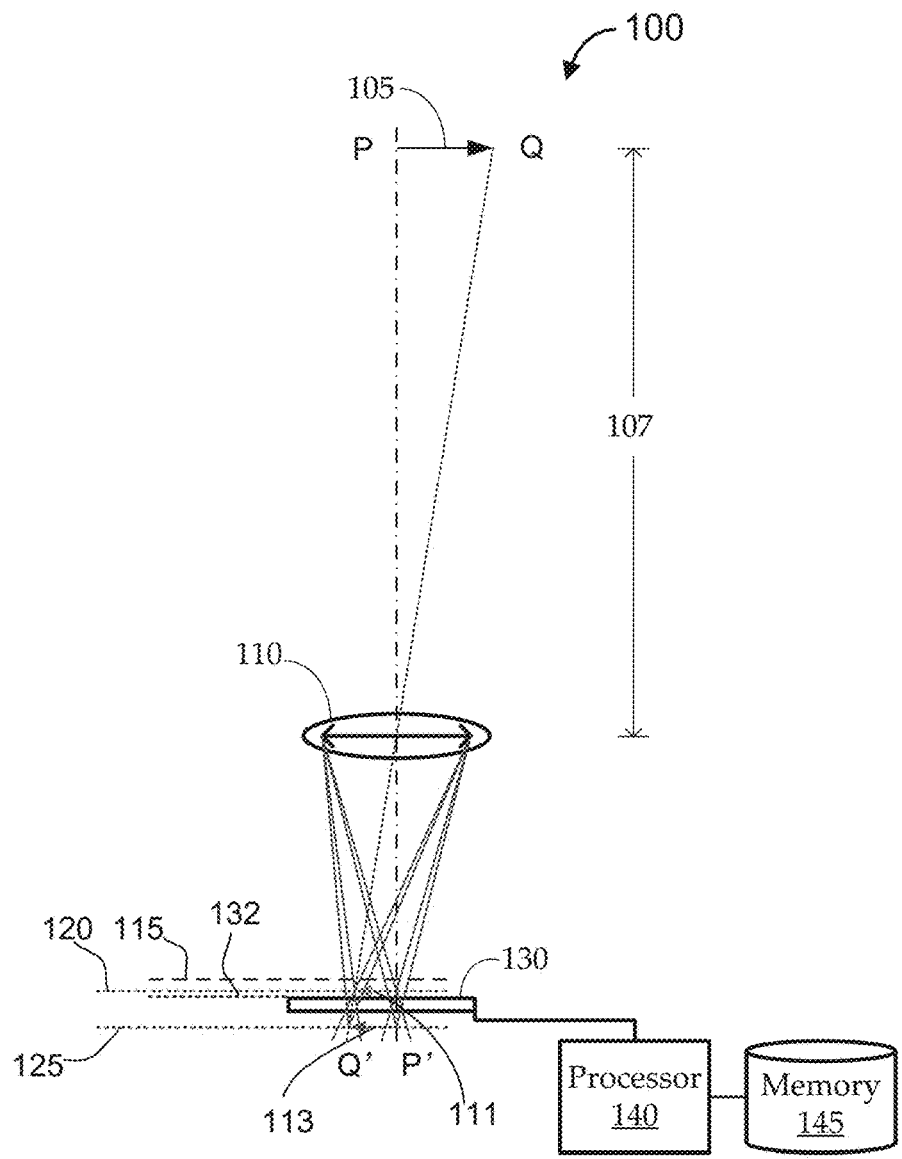
FIGS. 1A and 1B shows a passive 3D image sensing environment and illustrative imaging results, respectively, according to various embodiments.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION OF THE INVENTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Increasingly, digital imaging is exploiting depth information to support various features. For example, in three-dimensional (3D) computer graphics, depth maps are used to indicates information relating to the distance of the surfaces of scene objects from a viewpoint. Similarly, in digital photography, depth mapping, and the like, can be used to support 3D image capture features, enhanced auto-focusing features, and other features. Such digital 3D imaging is also being used to support platforms, such as 3D cameras, 3D robot vision, 3D vehicle mapping, etc. Conventionally, active techniques are used for acquiring such depth information. For example, so-called "time-of-fly" (TOF) techniques generally measure a distance of an object with respect to a reference point by emitting light beams towards an object, and measuring timing of reflections of the emitted light. With such techniques, distance can be computed by comparing the speed of light to the time it takes for the emitted light to be reflected back to the system. As another example, multiple structured light can be used to determine distance by transmitting multiple light beams in a manner that they converge and diverge at different distances. With such techniques, distance can be measured by separately imaging an object with each light beam, and comparing the images to determine a level of overlap, which can be correlated to distance. Such a technique is described in U.S. Pat. No. 10,489,925, titled "3D Sensing Technology Based on Multiple Structured Illumination."

Such conventional active techniques for 3D image sensing can be limited in various ways. One limitation is that the active illumination used by such conventional techniques can consume power and space, which may be limited in many applications, such as in smart phones and other portable electronic devices. Another limitation is that it can be difficult to dynamically calibrate such techniques to differences in ambient lighting, differences in how a detected object respond to illumination (e.g., based on the object's color, shape, reflectivity, etc.), and/or other differences between detection environments. Yet another limitation is that some such techniques rely on integrating additional optical systems into an environment with many physical and technical constraints.

Figure 1B:
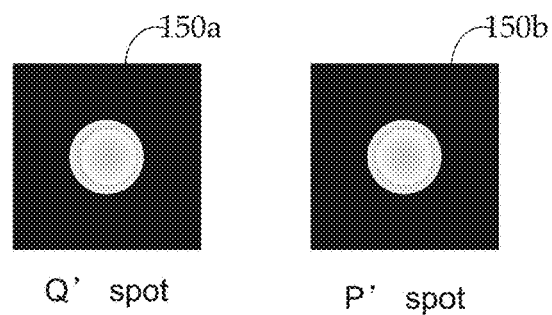

Turning first to FIGS. 1A and 1B, a passive 3D image sensing environment 100 and illustrative imaging results 150 are shown, respectively, according to various embodiments. The environment 100 includes a lens assembly 110, an image sensor 130, and processor 140. While the lens assembly 110 is shown as a single convex lens, the lens assembly 110 can include any suitable discrete lens components, such as convex and/or convex lenses, mirrors, apertures, filters, etc. For the sake of context, a representative scene object 105 is shown as extending between edges "P" and "Q". The scene object 105 is located an object distance 107 away from the lens assembly 110. While the object distance 107 is illustrated as between the scene object 105 and the filter mask 120, references herein to the object distance 107 can generally refer to a detectable distance between the scene object 105 and any suitable component. For example, the object distance 107 can indicate a distance between the scene object 105 and a particular lens component of the lens assembly 110, between the scene object 105 and the image sensor 130, etc.

In a typical imaging environment, there may be ambient light and/or probe lighting. For example, the scene object 105 can be illuminated by ambient sunlight, artificial environmental lighting (e.g., overhead lights in a room, lamps, etc.), lighting directed toward the scene object 105 by dedicated illumination components (e.g., components of a camera system including the lens assembly 110, image sensor 130, processor 140), etc. The light reflects off of one or more surfaces of the scene object 105, and some of the light is reflected in the direction of the lens assembly 110. For example, the lens assembly 110 includes an aperture (e.g., a natural aperture and/or mechanical aperture, etc.) through which the reflected light passes. Light passing through the lens assembly 110 can be focused, by the lens assembly 110, onto the image sensor 130.

Embodiments of the image sensor 130 include a large number of photodetector elements (e.g., pixels) arranged in any suitable manner. The photodetector elements can lie in a detection plane 132. In some implementations, the photodetector elements are arranged in an array. The photodetector elements are responsive to multiple chromatic components of the reflected light. For example, each pixel can include photodetector elements responsive to red light, green light, and blue light. The photodetector elements can be configured to respond to any suitable chromatic components (e.g., colors), such as particular frequency sub-band in the optical band, infrared and/or ultraviolet sub-bands, etc. When light beams of a particular chromatic component intersect with the detection plane 132 (i.e., with the photodetectors), the interaction can generate a magnitude of response in the photodetectors corresponding to that chromatic component. For example, a photodetector configured to detect blue light can produce a magnitude of optical response corresponding to an intensity of blue light interacting with the photodetector in its associated location on the image sensor 130. The responses of the photodetector elements can be interpreted as optical information and used to generate images of the scene object 105.

Figure 2:
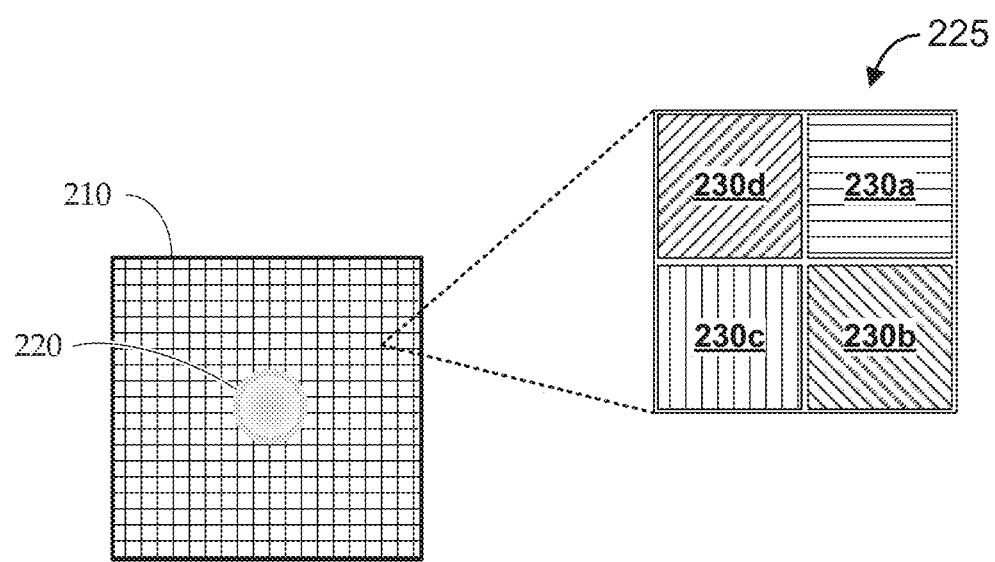
FIG. 2 shows an example of a photodetector array of an image sensor, along with an illustrative photodetector pixel, according to various embodiments.

FIG. 2 shows an example of a photodetector array 210 of an image sensor, along with an illustrative photodetector pixel 225, according to various embodiments. The photodetector array 210 can include an array of any suitable photodetector elements, each for detecting one or more chromatic components (e.g., colors) of light. Each photodetector element, or group of elements, generates an electrical output in response to interaction with light of the chromatic component. For example, when light within a particular frequency band illuminates a photodetector element configured to respond to that frequency band, the photodetector element and associated circuitry outputs an electrical signal. The electrical signal can indicate an intensity of the light interacting with the photodetector element (e.g., signal strength can correlate to image brightness). For example, each photodetector element can be associated with a respective location in the detection plane 132 and/or a particular chromatic component, and the raw output data of the image sensor 130 can include intensity values for the chromatic components across the locations. In one implementation, the image sensor 130 generates, for each photodetector element, a 12-bit digital value corresponding to one of 4,096 possible detected intensity levels for a corresponding color.

The pixel 225 can be an implementation of a set of photodetector elements 230, of the image sensor 130 described with reference to embodiments herein. The illustrative pixel 225 includes four photodetector elements 230 (e.g., photodiodes). For example, the photodetector elements 230 are configured to detect light components in the visible spectrum and/or other optical spectra (e.g., near-infrared). In one implementation, the photodetector elements 230 are arranged according to a Bayer pixel pattern to include one red photodetector element 230 (i.e., one photodetector configured to detect a light component in the red band of the color spectrum), one blue photodetector element 230, and two green photodetector elements 230. In other implementations, other arrangements of photodetector elements 230 can be used to form the pixel 225. For example, a modified Bayer pixel pattern can be used, in which one of the green photodetector elements 230 is replaced by a near-infrared photodetector element 230. Though the illustrated pixel 225 includes four photodetector elements, each pixel 225 can include any suitable number of photodetector elements 230 of any suitable type. Further, different pixels 225 may have different numbers and/or types of photodetector elements 230.

Returning to FIGS. 1A and 1B, though it can be convenient to refer to a lens as having a particular focal length, lenses tend to focus different chromatic components to different respective focal lengths. For example, optical parts tend to have lower refractive indices (RI) at longer wavelengths. As such, the optics tend to bend shorter wavelengths more than longer wavelengths, manifesting as longer focal lengths for longer wavelengths. Further, magnification of a lens tends to be proportional to its focal length, such that a same object will tend to produce a larger image at a longer wavelength. Such phenomena are typical in many imaging systems, particularly where micro-lens components are used, as such components typically do not compensate for color differences with the optical parts themselves. Instead, in such systems, color differences are is corrected with processing of detected optical data. For example, in digital cameras and other typical digital imaging environments, chromatic focal differences can be seen in raw detector data, but those differences are commonly corrected in hardware and/or software of the imaging system prior to outputting the data to other components.

In the environment 100, multiple focal planes are shown to illustrate example chromatic focal differences of the lens assembly 110. For reference, the environment 100 includes a nominal focal plane 115, which indicates an illustrative focal plane for substantially collimated light, such as light reflected from the scene object 105 when the object distance 107 is infinitely far away from the lens assembly 110. The environment 100 also includes a smaller-wavelength (e.g., blue) focal plane 120 of the lens assembly 110 and a larger-wavelength (e.g., red) focal plane 125 of the lens assembly 110. For example, light components below approximately 500 nanometers in wavelength (e.g., within a band of 450-485 nanometers) tend to be focused around the smaller-wavelength focal plane 120, while light components above approximately 600 nanometers in wavelength (e.g., within a band of 625-740 nanometers) tend to be focused around the larger-wavelength focal plane 125. Depending on the configuration of the lens assembly 110, the smaller-wavelength focal plane 120 and the larger-wavelength focal plane 125 may be closer together or farther apart, may be substantially co-planar with the nominal focal plane 115, etc.

Embodiments of imaging systems typically provide for focusing of the lens assembly 110 with respect to the detection plane 132. The focusing can seek to optimize one or more parameters, such as brightness, contrast, color balance, etc. In some embodiments, achieving such focusing involves mechanically adjusting the relative position of components of the lens assembly 110 and/or image sensor 130. As one example, the position of the image sensor 130 can be shifted toward, or away from, the lens assembly 110. As another example, components of the lens assembly 110 can be moved relative to each other and/or relative to the image sensor 130 to adjust the positions of one or more associated focal planes. The focusing can be manual and/or automatic. Many typical imaging systems with automatic focusing seek to position the detection plane 132 of the image sensor 130 in a location that maximizes color balance. Such a color-balanced position can also tend to correspond to a contrast-optimized imaging location. Because the larger-wavelength focal plane 125 is farther away from the lens assembly 110 than the smaller-wavelength focal plane 120, larger-wavelength light components tend to spread out more than smaller-wavelength light components prior to reaching the detection plane 132. As such, the color-balanced imaging location is typically closer to the smaller-wavelength focal plane 120 than to the larger-wavelength focal plane 125. For example, the color-balanced imaging location may be located approximately one-third of the distance from the smaller-wavelength focal plane 120 to the larger-wavelength focal plane 125. As illustrated, focusing of the smaller-wavelength light components onto the smaller-wavelength focal plane 120 forms a smaller-wavelength image 111 of the scene object 105 at the smaller-wavelength focal plane 120, and focusing of the larger-wavelength light components onto the larger-wavelength focal plane 125 forms a larger-wavelength image 113 at the larger-wavelength focal plane 125. As such, an image formed and detected at the detection plane 132 effectively includes a balance of the smaller-wavelength image 111 and larger-wavelength image 113.

The chromatic focal differences of the lens assembly 110 tend to be most apparent, and therefore most detectable, at edge locations of the scene object 105. For the sake of illustration, FIG. 1B shows illustrative raw detector images 150. The first raw detector image 150a is an image of edge Q (denoted as Q') of the scene object 105, and the second raw detector image 150b is an image of edge P (denoted as P') of the scene object 105. It can be seen in both images 150 that the blue image components tend to be focused toward the center of each image 150, and the red components tend to be focused around the outside of each image 150. As noted above, this is due at least to the chromatic differences in focal length manifesting as higher magnification for the larger (e.g., red) wavelengths.

Figure 3A:
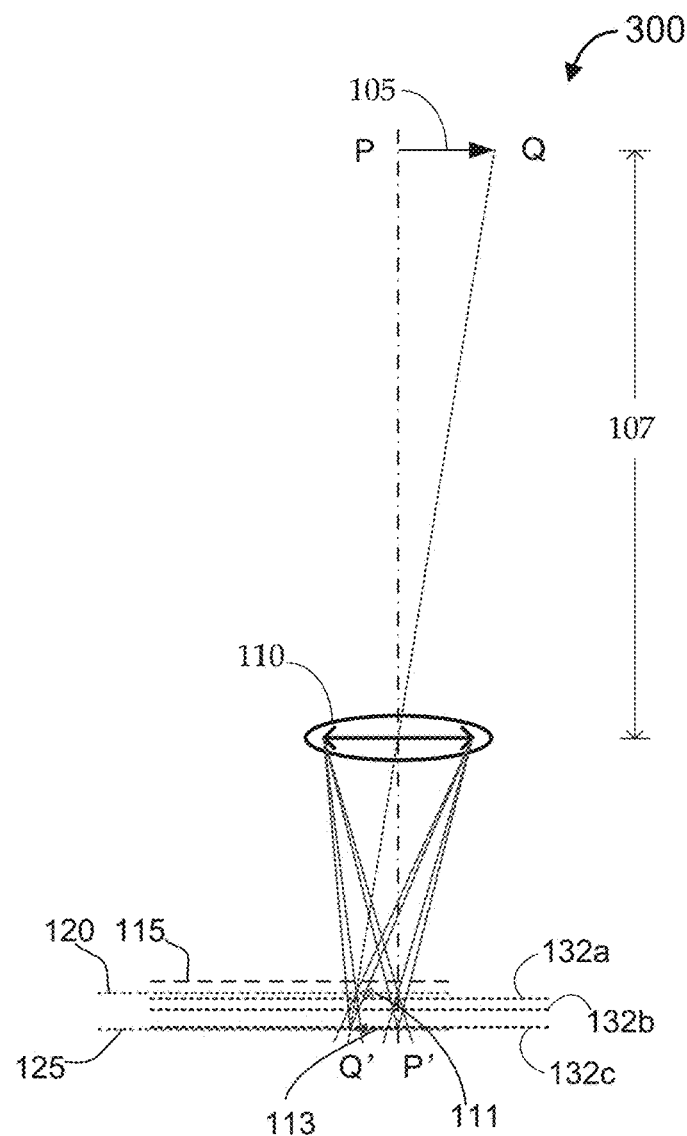
FIG. 3A shows another passive 3D image sensing environment, like the environment shown in FIG. 1A.
Figure 3B:
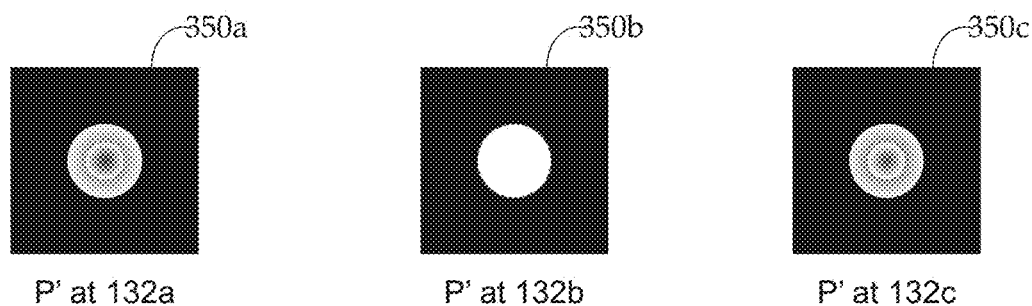
FIG. 3B shows example raw detector images for a white spot at edge "P" of FIG. 3A.
Figure 3C:
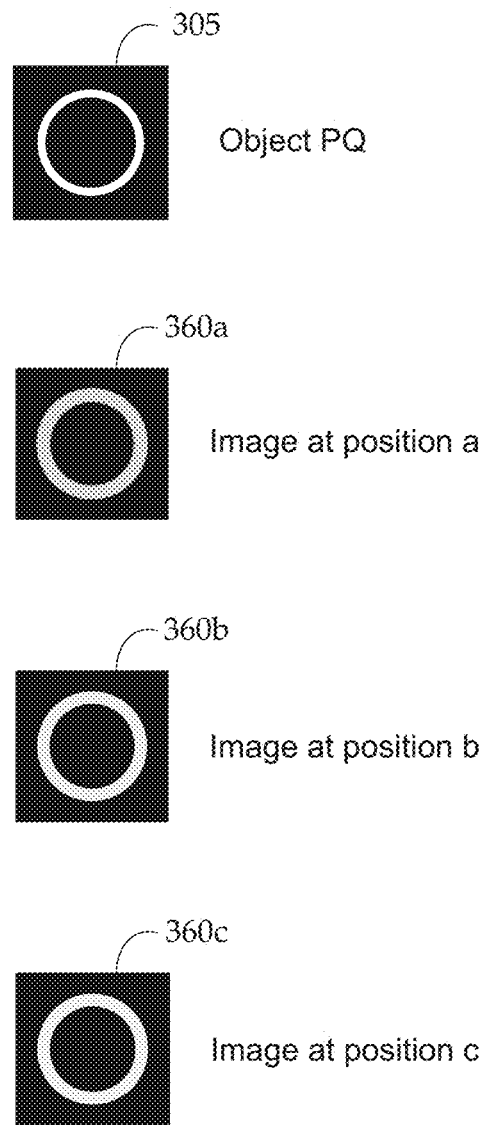
FIG. 3C shows an illustrative scene object and example raw detector images for the object in accordance with FIG. 3A.

The effects of chromatic differentiation are further clarified by FIGS. 3A-3C. FIG. 3A shows another passive 3D image sensing environment 300, like the environment shown in FIG. 1A. As described above, the environment 300 includes a lens assembly 110 and a detection plane 132 associated with an image sensor 130 (not shown). The processor 140 and memory 145 are not explicitly shown. The representative scene object 105 is again shown as located an object distance 107 away from the lens assembly 110 and as extending between edges "P" and "Q". The location and other characteristics of the lens assembly 110 can define the locations of a nominal focal plane 115, a smaller-wavelength focal plane 120, and a larger-wavelength focal plane 125. Three different locations are shown for the detection plane 132, all lying between the smaller-wavelength focal plane 120 and the larger-wavelength focal plane 125. A first detection plane 132a is shown very close to the smaller-wavelength focal plane 120, a second detection plane 132b is shown in a color-balanced location approximately one-third of the distance from the smaller-wavelength focal plane 120 to the larger-wavelength focal plane 125, and a third detection plane 132c is shown very close to the larger-wavelength focal plane 125.

FIG. 3B shows example raw detector images 350 for a white spot at edge "P." A first of the raw detector images 350a corresponds to the image sensor 130 positioned in accordance with detection plane 132a. With the detection plane 132a close to the smaller-wavelength focal plane 120, it can be seen that the smaller-wavelength light components are focused toward the center of the image 350a, and the larger-wavelength light components are spread toward the outside of the image 350a. A third of the raw detector images 350c corresponds to the image sensor 130 positioned in accordance with detection plane 132c. With the detection plane 132c close to the larger-wavelength focal plane 125, it can be seen that the larger-wavelength light components are focused toward the center of the image 350c, and the smaller-wavelength light components are spread toward the outside of the image 350c. A second of the raw detector images 350b corresponds to the image sensor 130 positioned in accordance with detection plane 132b. With the detection plane 132b in a color-balanced position, it can be seen that the color difference across most of the image 350b is minimized (e.g., even undetectable), and the larger-wavelength light components appear primarily in a small band around the outer edge of the image 350b. For example, some automatic color balancing techniques tend to effectively zoom out (e.g., move the detection plane 132 toward the smaller-wavelength focal plane 120) until the larger-wavelength light components appear at the edges of the image.

FIG. 3C shows an illustrative scene object 305 and example raw detector images 360 for the object. The scene object 305 is a white ring on a black background. Three raw detector images 360a, 360b, and 360c correspond to the image sensor 130 positioned in accordance with detection plane 132a, 132b, and 132c, respectively. For a continuous object surface, the image of each point tends to be affected by sub-images of all nearby points, such that neighboring points' sub-images at least partially overlap. This effect tends automatically to color-correct the image away from the edges, and the chromatic differences discussed herein tend to be detectable only at edges or other non-uniform positions of an object, accordingly. With the detection plane 132a close to the smaller-wavelength focal plane 120 in image 360a, the larger-wavelength light components are seen at the edges of the image 360a, and other portions of the image 360a can tend to favor the smaller-wavelength light components. With the detection plane 132c close to the larger-wavelength focal plane 125 in image 360c, the smaller-wavelength light components can be seen at the edges of the image 360c, and other portions of the image 360c can tend to favor the larger-wavelength light components (these effects may be relatively undetectable without using hardware and/or software). With the detection plane 132b in the color-balanced location, the color difference remains at a minimum across the image 360b.

Returning to FIGS. 1A and 1B, embodiments provide novel techniques for 3D image sensing based on passive optical techniques, particularly exploiting the types of chromatic focal differentiation described above. This chromatic focal differentiation can manifest as a difference in magnitude of chromatic response (MCR) (e.g., brightness) for different chromatic components. The inventors of embodiments described herein have recognized that these differences can be detected as a ratio between the MCR of one particular chromatic component and the MCR of another particular chromatic component, and that this ratio can be strongly correlated to the object distance 107.

Embodiments of the processor 140 can exploit this correlation to passively detect object distance based on detected differences in MCR. As described above, the image sensor 130 is in optical communication with the lens assembly 110 and includes photodetector elements. A first subset of the photodetector elements is configured to produce a first set of chromatic responses to a smaller-wavelength component of the received light, and a second subset of the photodetector elements is configured to produce a second set of chromatic responses to a larger-wavelength component of the received light. For example, some photodetector elements respond to blue light and others respond to red light. The processor 140 can receive raw image data from the image sensor 130 indicating the first set of chromatic responses and the second set of chromatic responses. For example, each photodetector element (e.g., each color detector in each pixel) can output to the processor 140 a 12-bit value indicating one of 4,096 levels of brightness detected for its respective color at its respective location. The processor 140 can include a central processing unit CPU, an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set (RISC) processor, a complex instruction set processor (CISC), a microprocessor, or the like, or any combination thereof. In some implementations, the image sensor 130 is configured to pass raw optical information to the processor 140 via a bus, or in any other suitable manner. The processor 140 can compute a first magnitude of chromatic response (MCR) from the first set of chromatic responses and a second MCR from the second set of chromatic responses. For example, the processor 140 can determine an edge region for detection and can find a largest value for each chromatic component in that region. The processor 140 can then determine an object distance 107 of the scene object 105 based on a ratio between the first MCR and the second MCR. The determination can be based on calibration data and/or other data stored in memory 145 in communication with the processor 140, and/or based on one or more formulas describing a mathematical correlation between the ratio data and object distance 107.

FIGS. 1A and 3A show only a single scene object 105 for the sake of simplicity. However, scenes typically include multiple scene objects 105 at respective object distances 107, and/or a scene object 105 may have multiple features at different object distances 107. In some embodiments, the optical system (e.g., the lens assembly 110 and/or image sensor 130) is focused on a first scene object as a reference object, and the optical system is calibrated to that object. For example, as described above (e.g., as illustrated by images 350b and 360b in FIGS. 3B and 3C, respectively), embodiments can focus the lens assembly 110 and/or image sensor 130 so that the detection plane 132 is in a color-balanced location with respect to a particular object in the scene. For that object, the color difference is at a minimum (e.g., or is relatively small), and other objects and/or surfaces in the scene that are closer to, and/or farther from, the lens assembly 110 can be imaged according to embodiments herein to detect chromatic focal differences for distance measurement. Thus, embodiments can focus on, and calibrate according to, one object in a scene, and can then determine other object distances in the scene in accordance with that calibrated reference object distance.

Figure 4A:
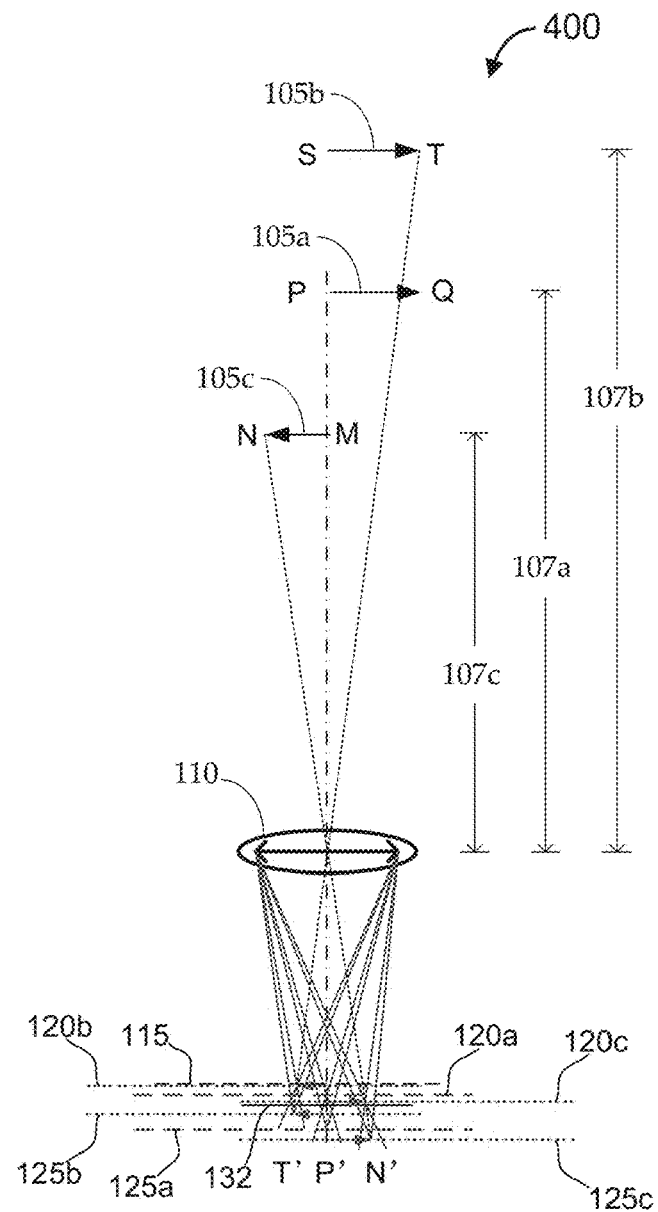
FIG. 4A shows another passive 3D image sensing environment with multiple scene objects at different object distances.
Figure 4B:
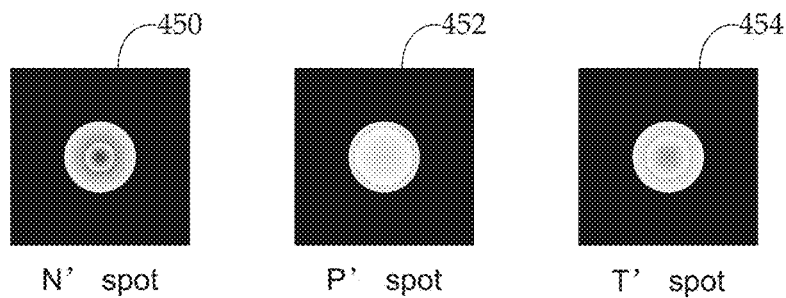
FIG. 4B shows representative raw detector images corresponding to the different scene objects in FIG. 4A.

FIG. 4A shows another passive 3D image sensing environment 400 with multiple scene objects 105 at different object distances 107; and FIG. 4B shows representative raw detector images corresponding to the difference scene objects 105. As described above, the environment 400 includes a lens assembly 110 and a detection plane 132 associated with an image sensor 130. The processor 140 and memory 145 are not explicitly shown. Three scene objects 105 are shown, each at an associated one of three object distances 107. A first scene object 105a is shown as located a first object distance 107a away from the lens assembly 110 and as extending between edges "P" and "Q". This first scene object 105a is illustrated as a reference object by which to focus and calibrate the lens assembly 110 and/or the image sensor 130. For example, automatic focusing and color-balancing of the lens assembly 110 and image sensor 130 cause the detection plane 132 to be positioned between (e.g., approximately one-third of the distance between) a reference smaller-wavelength focal plane 120a and a reference larger-wavelength focal plane 125a. As such, imaging of the reference scene object 105a yields a minimized (or relatively small) MCR ratio between smaller-wavelength light components and larger-wavelength light components. This can be seen in the color-balance of the illustrative raw detector image 452 of a white spot at edge "P" in FIG. 4B.

A second scene object 105b is shown as located a second object distance 107b away from the lens assembly 110, which is farther than the calibrated object distance 107a. The second scene object 105b extends between edges "S" and "T". Light reflecting off of the second scene object 105b from the second object position 107b is focused differently by the lens assembly 110 than the light originating from reflections at the calibrated object distance 107a. As such, the second scene object 105b is associated with its own second smaller-wavelength focal plane 120b and second larger-wavelength focal plane 125b. Because the second scene object 105b is farther away than the calibrated object distance 107a, the smaller-wavelength focal plane 120b and the larger-wavelength focal plane 125b tend to be shifted toward the nominal focal plane 115. This chromatic focal plane shift effectively shifts the relative position of the detection plane 132 to be closer to the larger-wavelength focal plane 125b for the second scene object 105b. As such, imaging of the second scene object 105b yields a higher MCR ratio with smaller-wavelength light components distributed over a wider area of the image. This can be seen in the color-balance of the illustrative raw detector image 454 of a white spot at edge "T" in FIG. 4B.

A third scene object 105c is shown as located a third object distance 107c away from the lens assembly 110, which is closer than the calibrated object distance 107a. The third scene object 105c extends between edges "M" and "N". Light reflecting off of the third scene object 105c from the third object position 107c is focused differently by the lens assembly 110 than the light originating from reflections at the calibrated object distance 107a. As such, the third scene object 105c is associated with its own third smaller-wavelength focal plane 120c and third larger-wavelength focal plane 125b. Because the third scene object 105c is closer than the calibrated object distance 107a, the smaller-wavelength focal plane 120c and the larger-wavelength focal plane 125c tend to be shifted away from the nominal focal plane 115. This chromatic focal plane shift effectively shifts the relative position of the detection plane 132 to be closer to the smaller-wavelength focal plane 125c for the third scene object 105b. As such, imaging of the third scene object 105c yields a higher MCR ratio with larger-wavelength light components distributed over a wider area of the image. This can be seen in the color-balance of the illustrative raw detector image 450 of a white spot at edge "N" in FIG. 4B.

For simplicity, some descriptions above assume detection of a white feature on a black background. However, novel techniques described herein can be implemented in any color context with proper chromatic calibration. In some cases, such chromatic calibration involves selecting chromatic components based on the scene colors. For example, if features are being detected on a blue background, techniques can compute and exploit MCR ratios between other color photodetectors (e.g., red and green photodetectors in a pixel), so that the background "blue" is effectively seen as an absence of color (i.e., black) to the detection system. Still, the colors in a particular scene are typically not optimal for detection of chromatic differentiation, as described herein. For example, if a blue object is in front of a red object in a scene, a pure blue-to-red MCR ratio may not yield accurate information for detection; regardless of the relative object distances, the red object will have overwhelmingly high MCR for red, and the blue object will have overwhelmingly high MCR for blue. As such, some embodiments chromatically calibrate object colors as part of the MCR computations to effectively calibrate out effects of the object color on the detection.

Figure 5:
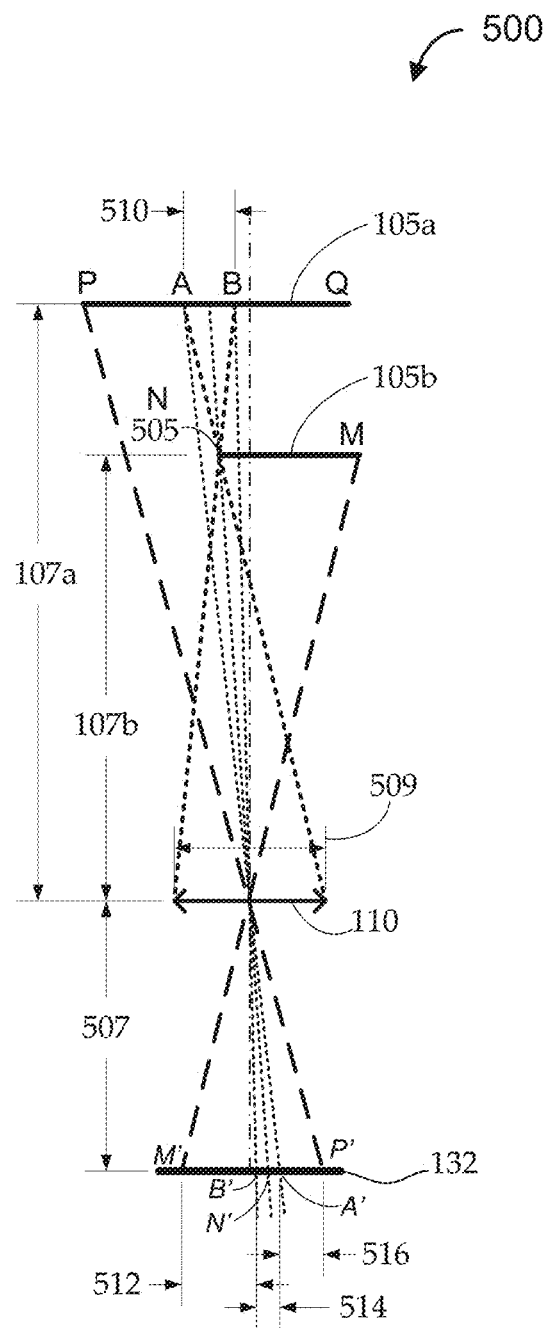
FIG. 5 shows another passive 3D image sensing environment with multiple scene objects at different object distances to illustrate chromatic calibration, according to various embodiments.

FIG. 5 shows another passive 3D image sensing environment 500 with multiple scene objects 105 at different object distances 107 to illustrate chromatic calibration, according to various embodiments. As described above, the environment 500 includes a lens assembly 110 and a detection plane 132 associated with an image sensor 130. The processor 140 and memory 145 are not explicitly shown. A first scene object 105a is shown as located a first object distance 107a away from the lens assembly 110 and as extending between edges "P" and "Q". This first scene object 105a is illustrated as a reference object (e.g., a background) by which to focus and calibrate the lens assembly 110 and/or the image sensor 130. For example, automatic focusing and color-balancing of the lens assembly 110 and image sensor 130 can be performed with reference to the first scene object 105a, such that imaging of the first scene object 105a yields a minimized (or relatively small) MCR ratio between smaller-wavelength light components and larger-wavelength light components. A second scene object 105b is shown as located a second object distance 107b away from the lens assembly 110 and as extending between edges "M" and "N". It is assumed that the system is seeking to compute a distance for edge "N" 505 (which corresponds in the Figure to object distance 107b), such that chromatic calibration is being performed for edge "N" 505.

As described above, distance measurements herein are calibrated based on detecting chromatic differentiation for a reference object, which can include color balancing the imaging system with respect to the reference object. For the sake of simplicity, some descriptions above assume that other objects for which distance is being measured are chromatically comparable; that each detected feature is the same color and is being imaged relative to a same color background. For example, FIGS. 4A and 4B assume a white spot on a background at multiple distances. However, the MCR ratios may be different for two objects with different edge colors and/or background colors, even when the objects are at a same object distance. As such, in some cases, obtaining accurate distance measurements using the techniques described herein can rely on calibrating out such differences in feature and/or background color. In the illustrated case of FIG. 5, chromatic calibration is being applied to edge "N" 505 to determine, and calibrate out, a feature color for edge "N" 505 and a background color behind edge "N" 505.

To find the relevant chromatic calibration information, embodiments detect the background color as the color of scene object 105a (or at least the color of a portion of scene object 105a close to a feature imaging region), and detect the feature color as the color of scene object 105b (or at least the color of a portion of scene object 105a close to the feature imaging region). To that end, embodiments determine multiple regions of interest at the detection plane 132, including at least the feature imaging region 514 in which the desired feature can be seen on its background, a background color calibration region 516, and a feature color calibration region 512. These regions relate to characteristics of optical components, relative distances of the scene objects 105, and/or other factors. The lens assembly 110 has an effective aperture diameter 509 and, after focusing and/or color balancing, is located a lens-to-detector distance 507 from the detection plane 132. As illustrated, the effective aperture diameter 509 and lens-to-detector distance 507 effectively define a background object region 510 (shown extending between "A" and "B") as the background of edge "N" 505 that will be seen at the detection plane 132 in the feature imaging region 514. As such, feature imaging region 514 is shown as extending between A' and B', which are projections of "A" and "B" onto the detection plane 132. Some or all of a remaining image of scene object 105a (i.e., any portion of the area between "A" and "P") can be used as the background color calibration region 516. As such, background color calibration region 516 is shown as extending between A' and P', which are projections of "A" and "P" onto the detection plane 132 (e.g., though only a proximate portion of that region may be used for calibration, such as where the color changes over the region). Some or all of a remaining image of scene object 105b (i.e., any portion of the area between "B" and "M") can be used as the feature color calibration region 512. As such, feature color calibration region 512 is shown as extending between B' and M', which are projections of "B" and "M" onto the detection plane 132 (e.g., though only a proximate portion of that region may be used for calibration, such as where the color changes over the region). With the regions defined according to the above, the feature color for edge "N" 505 can be calibrated based on the color of scene object 105b, and the background color for edge "N" 505 can be calibrated based on the color of scene object 105a.

In one implementation, the image sensor 130 is an array of pixels, each having a red (R), green (G), blue (B), and near-infrared (IR) photodetector. The output signal of each photodetector of each pixel corresponds to a particular physical location in the array (denoted by an "x" and "y" location) and a detected intensity of its respective chromatic component. Each output signal is also dependent on one or more of a determined color of scene object 105a (C1), a determined color of scene object 105b (C2), the effective aperture diameter 509 (D), the lens-to-detector distance 507 (S'), the object distance 107a of scene object 105a (S1), and the object distance 107b of scene object 105b (S2). For example, in the background color calibration region 516, the photodetector output signals for a particular pixel can be defined as:

$R1 = R1(x, y, C1, D, S1, S')$;

$G1 = G1(x, y, C1, D, S1, S')$;

$B1 = B1(x, y, C1, D, S1, S')$;

$IR1 = IR1(x, y, C1, D, S1, S')$.

In the feature color calibration region 512, the photodetector output signals for a particular pixel can be defined as:

$$R2=R2(x,y,C2,D,S2,S');$$

$$G2=G2(x,y,C2,D,S2,S');$$

$$B2=B2(x,y,C2,D,S2,S');$$

$$IR2=IR2(x,y,C2,D,S2,S').$$

In the feature imaging region 514, the photodetector output signals for a particular pixel can be defined as:

$$R=R(x,y,C1,C2,D,S1,S2,S');$$

$$G=G(x,y,C1,C2,D,S1,S2,S');$$

$$B=B(x,y,C1,C2,D,S1,S2,S');$$

$$IR=IR(x,y,C1,C2,D,S1,S2,S').$$

While the illustrations show scene object 105a and scene object 105b as having different object distances 107, this may not be the case. For example, where an object has a non-uniform area, marks, multiple edges, etc., scene object 105b can refer to a feature on scene object 105a having a detectable edge. In such a case, object distance 107a and object distance 107b are substantially equal (or precisely equal). Techniques described herein can still work in such a case. For example, S1 and S2 can be equal in the illustrative pixel signal output functions described above, and the chromatic calibration can still work.

In some cases, large regions of an object can be without sufficient features for distance measurement. For example, a large, relatively smooth surface of an object may span a range of distances, but without any clearly detectable edges or reliably detectable changes in color. In these and other cases, embodiments can project probe illumination into the scene to add chromatically differentiable features to the scene. As one example, a bright spot in a relatively low-light environment can chromatically add an edge to the scene for use in detection. As another example, spot illumination of an optical frequency that is absent from, or uncommon in, the scene (e.g., near infrared light) can be used to add a chromatic edge to the scene. Such an addition of probe illumination can including projecting a single spot, projecting multiple spots (e.g., an array), projecting an illuminated pattern, scanning one or more illumination features over an area, etc.

As noted herein, various implementations involve one or more types of calibration. For example, the relationships between MCR ratios between different chromatic components and object distance 107 are not absolute and fixed. Rather, those relationships are functionally related at least to system configuration parameters. For example, the same MCR values and/or ratios can correspond to different object distances 107 for objects of different colors, when calibrated to reference objects at different distances, when optical components are differently focused and/or color-balanced, etc. For the sake of illustration, in a typical implementation, the optical system can first auto-focus and auto-color-balance with respect to a particular reference object, thereby automatically configuring the lens assembly 110 and the image sensor 130 in a manner that defines locations of at least the nominal focal plane 115, the smaller-wavelength focal plane 120, and the larger-wavelength focal plane 125 for the reference object. Finding distances of one or more other objects in the scene using chromatic differentiation techniques described herein involves applying a particular set of relationships between MCR ratios and object distances that correspond to the auto-focused and auto-color-balanced configuration of the optical system.

Thus, the processor 140 can account for these conditions when computing object distance 107. As described above, embodiments of the processor 140 can receive raw image data from the image sensor 130 indicating chromatic responses for different chromatic components (e.g., colors), MCRs based on the chromatic responses, and determine object distances of one or more scene objects based on ratios between the MCRs. In some embodiments, the processor 140 is aware of a present optical configuration, such as including a present configuration of the lens assembly 110 and/or image sensor 130 for focus and color-balancing. For example, the configuration is associated with a set of parameter values updated in a register, or other suitable storage; and the processor 140 can query the present optical configuration by obtaining the updated values. In some such embodiments, the processor 140 is programmed to implement a pre-determined mathematical correlation (e.g., a functional relationship) between object distance 107 and MCR ratio. In some such embodiments, one or more such mathematical correlations are stored in the memory 145. For example, different optical configurations may be manifest different, but still deterministic, mathematical correlations; and an appropriate correlation (e.g., particular scalar values for a polynomial function, a particular function, etc.) is retrieved from the memory 145 in accordance with the present optical configuration. In other embodiments, the memory 145 is used to store some or all associations between MCR ratio and object distance 107 for one or more optical configurations. For example, the processor 140 determines object distance 107 according to a lookup table, or the like, stored in a memory 145 accessible to the processor 140 (e.g., any suitable on-board or off-board, non-transient, processor-readable memory). As used herein, a lookup table generally refers to any associative data structure in which each of a first set of values can be associated with a respective one of a second set of values. Data stored in the memory 145 (e.g., lookup table data, mathematical correlation data, etc.) can be stored to the memory 145 as part of a pre-calibration. For example, prior calibration with targets of known color at known distances can be used to generate the data stored in the memory 145 and used by the processor 140.

The various optical systems illustrated and described above use chromatic differentiation to determine object distances for one or more objects in a scene of the optical system. In some implementations, a single object distance is determined. In other implementations, multiple discrete object distances are determined for multiple discrete locations in the scene. In other implementations, distance measurements across the scene are used to generate a depth map for the scene. Any of these and/or other implementations can be used to support a variety of three-dimensional (3D) imaging environments. For example, the types of 3D information that can be obtained by embodiments described herein can be used for 3D photography, 3D biometrics (e.g., 3D face identification), 3D vision for robots, 3D mapping for autonomous vehicles, range finding, etc. In some embodiments, systems for implementing the novel 3D imaging described herein (e.g., including the lens assembly 110, image sensor 130, processor 140, memory 145, etc.) can be integrated into an computational system, such as part of a computer, digital camera, smart phone, or other device.

Figure 6:
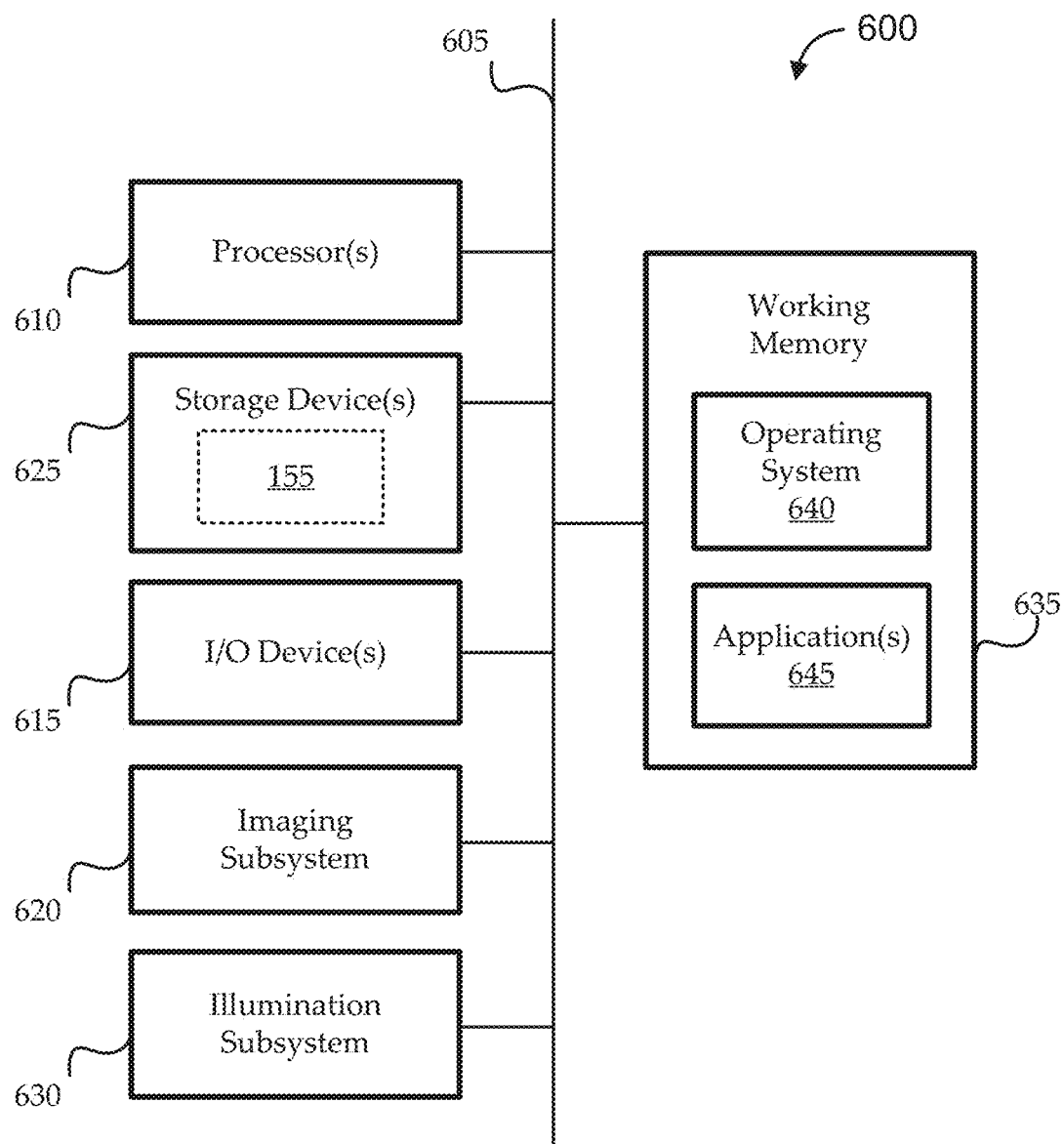
FIG. 6 provides a schematic illustration of one embodiment of a computer system that can implement various system components and/or perform various steps of methods provided by various embodiments.

FIG. 6 provides a schematic illustration of one embodiment of a computer system 600 that can implement various system components and/or perform various steps of methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown including hardware elements that can be electrically coupled via a bus 605 (or may otherwise be in communication, as appropriate). The hardware elements may include one or more processors 610, including, without limitation, one or more general-purpose processors and/or one or more special-purpose processors (such as digital signal processing chips, graphics acceleration processors, video decoders, and/or the like). For example, processors 610 can implement processor 140 shown in FIG. 1A. Some embodiments include one or more input/output (I/O) devices 615. In some implementations, the I/O devices 615 include human-interface devices, such as buttons, switches, keypads, indicators, displays, etc. In other implementations, the I/O devices 615 include circuit-level devices, such as pins, dip-switches, etc. In some implementations, the computer system 600 is a server computer configured to interface with additional computers and/or devices, such that the I/O devices 615 include various physical and/or logical interfaces (e.g., ports, etc.) to facilitate hardware-to-hardware coupling, interaction, control, etc.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 625 include memory 145 of FIG. 1A for storing calibration information, and/or any other suitable information, and/or instructions for implementing features described herein.

The computer system 600 can also include, or be in communication with, any other components described herein. In some embodiments, the computer system 600 includes an imaging subsystem 620. The imaging subsystem 620 can include the image sensor 130 and any supporting components. In some embodiments, the computer system 600 includes an illumination subsystem 630. The illumination subsystem 630 can include any suitable illumination sources for projecting normal illumination and/or reference illumination into a field of view of the imaging subsystem 620, and any supporting components. In some such embodiments, the illumination subsystem 630 includes one or more of illumination sources to provide reference illumination flooding and/or to provide one or more types of probe illumination. Some embodiments can include additional subsystems, such as a communications subsystem (not shown) to communicatively couple with other systems, networks, etc.

Embodiments of the computer system 600 can further include a working memory 635, which can include a RAM or ROM device, as described herein. The computer system 600 also can include software elements, shown as currently being located within the working memory 635, including an operating system 640, device drivers, executable libraries, and/or other code, such as one or more application programs 645, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods. A set of these instructions and/or codes can be stored on a non-transitory computer-readable storage medium, such as the non-transitory storage device(s) 625 described above. In some cases, the storage medium can be incorporated within a computer system, such as computer system 600. In other embodiments, the storage medium can be separate from a computer system (e.g., a removable medium, such as a compact disc), and/or provided in an installation package, such that the storage medium can be used to program, configure, and/or adapt a general purpose computer with the instructions/code stored thereon. These instructions can take the form of executable code, which is executable by the computer system 600 and/or can take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which can be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 can cause the processor(s) 610 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 600, various computer-readable media can be involved in providing instructions/code to processor(s) 610 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code. Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 600.

Figure 7A:
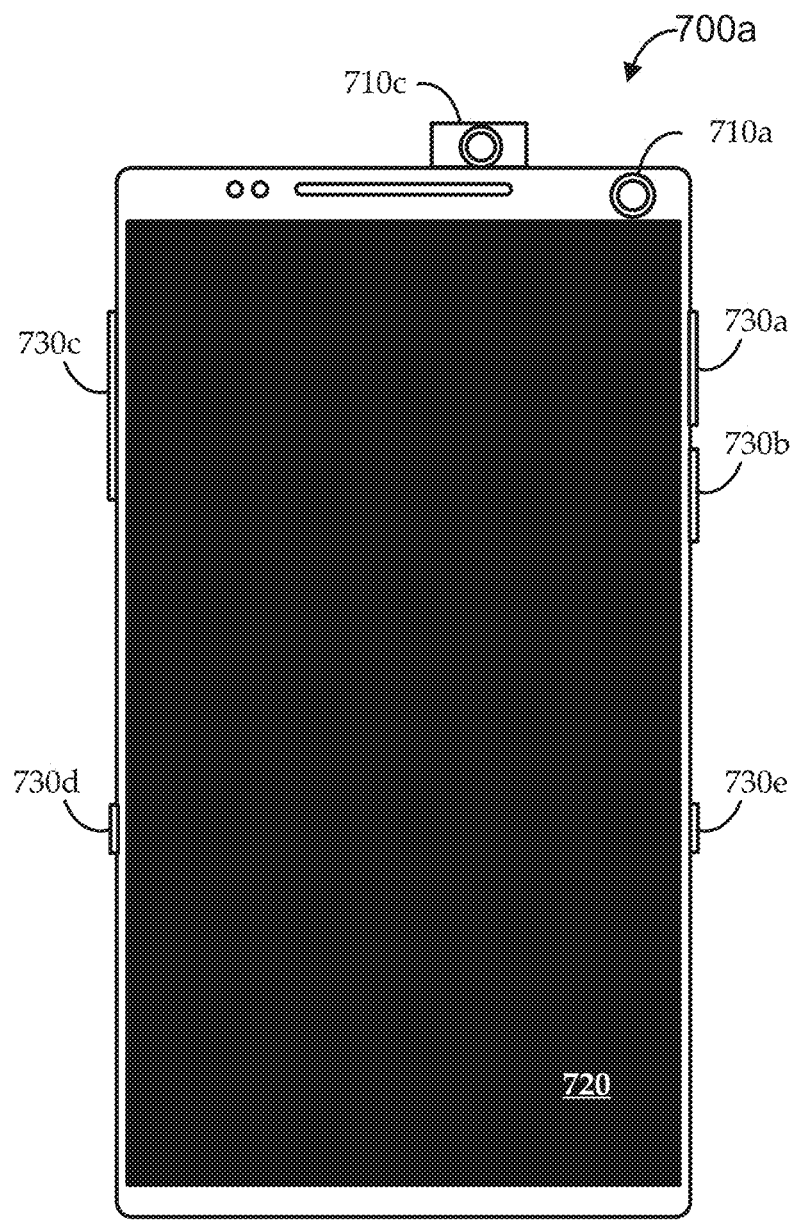
FIGS. 7A and 7B show front and side views, respectively, of an illustrative portable personal electronic device (PPED), according to various embodiments.
Figure 7B:
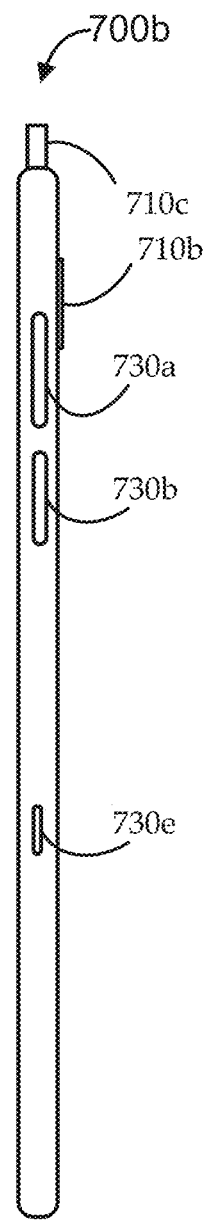

In some embodiments, systems for implementing the novel 3D imaging described herein, such as some or all of the computational system 600 of FIG. 6, can be integrated into an electronic device having a camera, such as a portable personal electronic device (PPED). FIGS. 7A and 7B show front and side views, respectively, of an illustrative portable personal electronic device (PPED) 700, according to various embodiments. As used herein, a PPED can include a smartphone, tablet computer, laptop computer, smart wearable device (e.g., a smartwatch), or any other suitable device that has one or more integrated digital imaging systems 710. Embodiments of the PPED 700 can also include one or more displays 720. Though not explicitly shown, some embodiments of the display 720 can have, integrated therewith, capacitive touchscreen elements, another digital imaging system 710, a fingerprint sensor, and/or other components. User interface components can also include one or more physical buttons 730. For example, the physical buttons 730 can include a power button, volume buttons, etc. In some implementations, one or more of the buttons is dedicated to a particular function, and one or more of the buttons is dynamically assignable (e.g., by an application processor and/or other components) to various functions. Though not shown, the PPED 700 can include additional user interface components, such as optical sensors, force sensors, biometric sensors, accelerometers, etc.

One or more (e.g., all) of the digital imaging systems 710 can include a passive 3D optical sensing system. The passive 3D optical sensing system(s) are configured to support capturing of depth information to support three-dimensional features of camera(s) and/or other components. For example, as illustrated, the PPED 700 can include a front-facing (e.g., selfie) digital imaging system 710a, a rear-facing digital imaging system 710b (shown in FIG. 7B), a pop-out digital imaging system 710c, and/or any other suitable integrated digital imaging systems 710. For example, a user desires to capture an image using one of the digital imaging systems 710. The PPED 700 initializes various hardware and software elements to enter an image acquisition mode. As part of the mode, a passive 3D optical sensing system is used to passively collect optical information from the scene in the field of view of the camera, and to determine one or more object distances, and/or generate a depth map of some or all of the scene. As described herein (e.g., with reference to FIGS. 1A, 3A, 4A, and 5), the optical information is passively received via various optics and sensors, including a lens assembly 110 and an image sensor 130, and can be processed by a processor 140 coupled with memory 145. In some embodiments, the one or more passive 3D optical sensing systems include, or take advantage of, one or more illumination sources, such as probe lighting sources. For example, the probe lighting sources can provide or supplement illumination having normal and/or reference light components. In some embodiments, the processor 140 and/or the memory 145 are dedicated components of the passive 3D optical sensing system. In other embodiments, the processor 140 is implemented by a processor of the PPED (e.g., a central processor, graphics processor, or other processor of the PPED, not specific to the passive 3D optical sensing system). In other embodiments, the memory 145 is implemented by memory of the PPED, such as removable or non-removable storage of the PPED not specific to the passive 3D optical sensing system.

Figure 8:
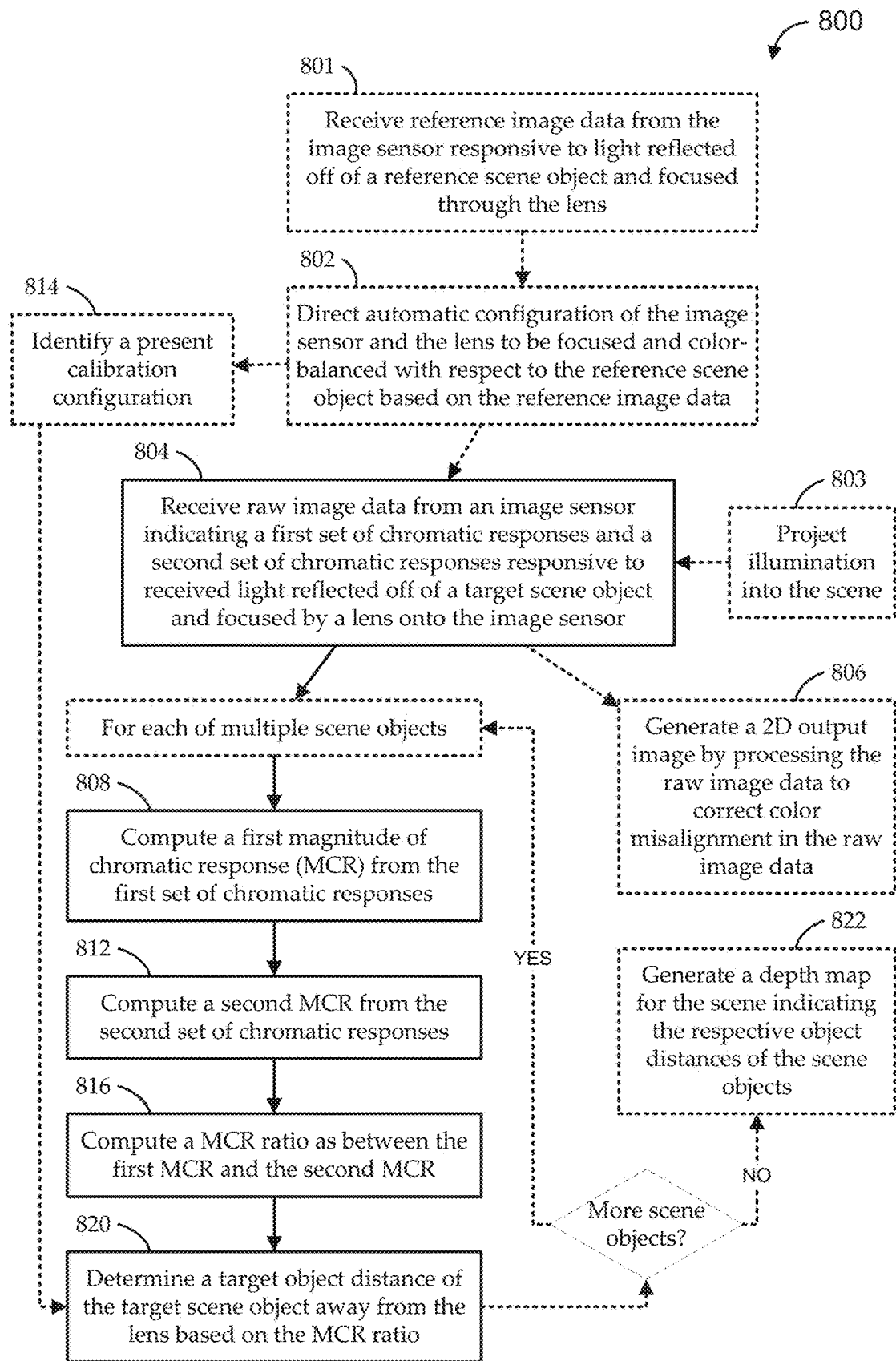
FIG. 8 shows a flow diagram of an illustrative method for passive three-dimensional imaging, according to various embodiments.

The various systems above can be used to perform various methods, such as those described below. FIG. 8 shows a flow diagram of an illustrative method 800 for passive three-dimensional imaging, according to various embodiments. Embodiments of the method 800 begin at stage 804 by receiving raw image data from an image sensor indicating a first set of chromatic responses and a second set of chromatic responses responsive to received light reflected off of a target scene object and focused by a lens onto the image sensor. A smaller-wavelength component of the received light is focused according to a target smaller-wavelength focal plane, and a larger-wavelength component of the received light is focused according to a target larger-wavelength focal plane. The first set of chromatic responses is produced by the image sensor responsive the smaller-wavelength component of received light, and the second set of chromatic responses is produced by the image sensor responsive to the larger-wavelength component of the received light. In some embodiments, the image sensor includes an array of photodetectors, a first portion of the photodetectors being responsive to the smaller-wavelength component of the received light (e.g., blue light), and a second portion of the photodetectors being responsive to the larger-wavelength component of the received light (e.g., red light).

In some embodiments, prior to the receiving at stage 804, the method 800 can project illumination into a field of view of the image sensor at stage 803. The illumination can include one or more spots, patterns, or any suitable illumination to produce one or more detection edge features in the field of view. In such embodiments, the target scene object can be one of the detection edge features. For example, if an object in the scene has an expansive surface with no suitably detectable features for chromatic differentiation, the illumination can provide the feature. Notably, this illumination is not intended to merely light up the detection area; rather, the illumination is to form a detectable feature in the scene.

The received raw image data can be used, as described herein, to generate 3D information according to at least stages 808-820, such as resulting in one or more object distances, a depth map, etc. Some embodiments, concurrent with (e.g., in parallel with) generating the 3D information, can generate a two-dimensional (2D) output image at stage 806 by processing the raw image data to correct color misalignment (e.g., and color-balance the data) in the raw image data. Some embodiments enable non-concurrent generation of the 3D and 2D information. For example, some or all of the raw image data is stored to a memory; and one of the 2D or 3D information is generated concurrent with the storing, while the other is generated at a later time.

At stage 808, embodiments can compute a first magnitude of chromatic response (MCR) from the first set of chromatic responses. At stage 812, embodiments can compute a second MCR from the second set of chromatic responses. In one implementation, the first MCR is computed as a maximum chromatic response (e.g., a maximum pixel signal output) to the smaller-wavelength component of the received light, and the second MCR is computed as a maximum chromatic response to the larger-wavelength component of the received light. In another implementation, the computation at stage 808 and/or 812 involves removing outliers, averaging, or otherwise determining an optimized one or more responses (e.g., pixels) to use as the corresponding MCR. At stage 816, embodiments can compute a MCR ratio as between the first MCR and the second MCR. In some implementations, the ratio is a ratio of the first MCR to the second MCR. In other implementations, the ratio is a ratio of the second MCR to the first MCR.

In some embodiments, additional chromatic responses can be received and/or used in the method 800. For example, a pixel may generate three or four chromatic responses (e.g., red, green, blue, and near-infrared). Some embodiments perform some or all of stages 808-816 using more than two chromatic responses. Other embodiments used the more than two chromatic responses to determine which two chromatic responses are most optimal for stages 808-816. For example, if it is determined that the background of a scene object is close to one of the chromatic responses, others of the chromatic response can be used in stages 808-816, thereby effectively rendering the background as black.

At stage 820, embodiments can determining a target object distance of the target scene object away from the lens based on the MCR ratio computed in stage 816. In some embodiments, the received light in stage 804 includes light reflected off of multiple scene objects (including the target scene object). For each of the plurality of scene objects, a respective portion of the smaller-wavelength component of the received light is focused to a respective smaller-wavelength focal plane corresponding to a respective object distance of the scene object away from the lens, and a respective portion of the larger-wavelength component of the received light is focused to a respective larger-wavelength focal plane corresponding to the respective object distance of the scene object. In such embodiments, the computing at stages 808 and 812 can include computing, for each scene object, a respective first MCR from the first set of chromatic responses and a respective second MCR from the second set of chromatic responses; and the determining at stage 816 can include determining, for each scene object, the respective object distance of the scene object based on a respective ratio between the respective first MCR and the respective second MCR. Some such embodiments, at stage 822, can generate a depth map for a scene including the scene objects, the depth map indicating the respective object distances of the scene objects. For example, stages 808-820 can be performed iteratively for the multiple scene objects until no more objects remain, after which the depth map can be generated at stage 822.

In some embodiments, the method 800 begins at stage 801 (e.g., prior to stages 804, 808, 812 and/or 816) by receiving reference image data from the image sensor responsive to light reflected off of a reference scene object and focused through the lens. The reference scene object is different from the target scene object and may be at the same or a different object distance away from the lens. In such embodiments, at stage 802, embodiments can direct automatic configuration of the image sensor and the lens to be focused and color-balanced with respect to the reference scene object based on the reference image data, thereby defining a reference smaller-wavelength focal plane and a reference larger-wavelength focal plane based at least on a reference distance of the reference scene object away from the lens. In some such embodiments, at stage 814, the method 800 can identify a present calibration configuration associated with directing the automatic configuration in stage 802. In such an embodiment, the present calibration condition corresponds to one of multiple predetermined calibration conditions. In such embodiments, determining the target object distance at stage 820 can involve associating the MCR ratio with the target object distance in accordance with a pre-calibrated correlation associated with the present calibration configuration. In some implementations, each of the calibration conditions is associated with a respective set of pre-calibrated parameter values for a shared set of parameters, and the pre-calibrated correlation is defined at least partially as a function of the shared set of parameters. In such implementations, determining the target object distance at stage 820 can involve computing the pre-calibrated correlation as a function of the respective set of pre-calibrated parameter values associated with the present calibration configuration. In other implementations, determining the target object distance at stage 820 can involve retrieving one of a respective number of mappings associated with the present calibration in a lookup table. The lookup table can define, for each of the calibration conditions, a respective number of mappings between calibrated MCR ratios and calibrated object distances. Such implementations can identify one of the calibrated MCR ratios as corresponding to the MCR ratio, and can map the one of the calibrated MCR ratios to one of the calibrated object distances according to the one of the respective number of mappings associated with the present calibration in the lookup table.

It will be understood that, when an element or component is referred to herein as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them. It will be understood that, although the terms "first," "second," "third," etc. may be used herein to describe various elements, components, these elements, components, regions, should not be limited by these terms. These terms are only used to distinguish one element, component, from another element, component. Thus, a first element, component, discussed below could be termed a second element, component, without departing from the teachings of the present invention. As used herein, the terms "logic low," "low state," "low level," "logic low level," "low," or "0" are used interchangeably. The terms "logic high," "high state," "high level," "logic high level," "high," or "1" are used interchangeably.

As used herein, the terms "a", "an" and "the" may include singular and plural references. It will be further understood that the terms "comprising", "including", having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components. Furthermore, as used herein, the words "and/or" may refer to and encompass any possible combinations of one or more of the associated listed items.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A passive three-dimensional imaging system comprising:
   a lens assembly to receive light reflected off of a target scene object and to focus the received light, such that a smaller-wavelength component of the received light is focused to a target smaller-wavelength focal plane, and a larger-wavelength component of the received light is focused to a target larger-wavelength focal plane;
   an image sensor in optical communication with the lens assembly and comprising a plurality of photodetector elements, a first subset of the photodetector elements configured to produce a first set of chromatic responses to the smaller-wavelength component of the received light, and a second subset of the photodetector elements configured to produce a second set of chromatic responses to the larger-wavelength component of the received light; and
   a processor configured to:
      receive raw image data from the image sensor indicating the first set of chromatic responses and the second set of chromatic responses;
      compute a first magnitude of chromatic response (MCR) from the first set of chromatic responses and a second MCR from the second set of chromatic responses; and
      determine an target object distance of the target scene object away from the lens assembly based on a ratio between the first MCR and the second MCR.

2. The system of claim 1, wherein the processor is further configured, prior to computing the first MCR and the second MCR, to:
   receive reference image data from the image sensor responsive to light reflected off of a reference scene object and focused through the lens assembly, the reference scene object being different from the target scene object; and
   direct automatic configuration of the image sensor and the lens assembly to be focused and color-balanced with respect to the reference scene object based on the reference image data, thereby defining a reference smaller-wavelength focal plane and a reference larger-wavelength focal plane based at least on a reference distance of the reference scene object away from the lens assembly.

3. The system of claim 2, wherein:
   the processor is further configured to identify a present calibration configuration associated with directing the automatic configuration, the present calibration condition corresponding to one of a predetermined plurality of calibration conditions; and
   the processor is configured to determine the target object distance from the ratio in accordance with a pre-calibrated correlation associated with the present calibration configuration.

4. The system of claim 3, further comprising:
   a memory having stored thereon, for each of the plurality of calibration conditions, a respective set of pre-calibrated parameter values for a shared set of parameters,
   wherein the pre-calibrated correlation is defined at least partially as a function of the shared set of parameters, and the processor is configured to determine the target object distance at least by computing the pre-calibrated correlation as a function of the respective set of pre-calibrated parameter values associated with the present calibration configuration.

5. The system of claim 3, further comprising:
   a memory having a lookup table stored thereon, the lookup table defining, for each of the plurality of calibration conditions, a respective plurality of mappings between MCR ratios and object distances,
   wherein the processor is configured to determine the target object distance at least by:
      retrieving one of the respective plurality of mappings associated with the present calibration condition;
      identifying one of the MCR ratios as corresponding to the ratio between the first MCR and the second MCR; and
      mapping the one of the MCR ratios to one of the object distances according to the one of the respective plurality of mappings associated with the present calibration in the memory.

6. The system of claim 1, wherein the processor is further configured to:
   generate a two-dimensional output image, concurrent with computing the first MCR and the second MCR and with determining the target object distance, by processing the raw image data to correct color misalignment in the raw image data.

7. The system of claim 1, wherein:
   the received light comprises light reflected off of a plurality of scene objects comprising the target scene object;
   for each of the plurality of scene objects, a respective portion of the smaller-wavelength component of the received light is focused to a respective smaller-wavelength focal plane corresponding to a respective object distance of the scene object away from the lens assembly, and a respective portion of the larger-wavelength component of the received light is focused to a respective larger-wavelength focal plane corresponding to the respective object distance of the scene object; and the processor is further configured, for each scene object, to:
compute a respective first MCR from the first set of chromatic responses and a respective second MCR from the second set of chromatic responses;
determine the respective object distance of the scene object based on a respective ratio between the respective first MCR and the respective second MCR; and
generate a depth map for a scene comprising the plurality of scene objects, the depth map indicating the respective object distances of the plurality of scene objects.

8. The system of claim 1, wherein:
the plurality of photodetector elements define a detection plane that is located between the target smaller-wavelength focal plane and the target larger-wavelength focal plane when the image sensor and the lens assembly are in a color-balanced focal arrangement.

9. The system of claim 1, further comprising:
an illumination source to project probe illumination onto one or more locations of the target scene object to produce one or more detection edge features.

10. A method for passive three-dimensional imaging, the method comprising:
receiving raw image data from an image sensor indicating a first set of chromatic responses and a second set of chromatic responses responsive to received light reflected off of a target scene object and focused by a lens onto the image sensor, such that a smaller-wavelength component of the received light is focused according to a target smaller-wavelength focal plane, and a larger-wavelength component of the received light is focused according to a target larger-wavelength focal plane, the first set of chromatic responses produced by the image sensor responsive the smaller-wavelength component of the received light, the second set of chromatic responses produced by the image sensor responsive to the larger-wavelength component of the received light;
computing a first magnitude of chromatic response (MCR) from the first set of chromatic responses;
computing a second MCR from the second set of chromatic responses;
computing a MCR ratio as between the first MCR and the second MCR; and
determining a target object distance of the target scene object away from the lens based on the MCR ratio.

11. The method of claim 10, further comprising, prior to computing the first MCR and the second MCR:
receiving reference image data from the image sensor responsive to light reflected off of a reference scene object and focused through the lens, the reference scene object being different from the target scene object; and
directing automatic configuration of the image sensor and the lens to be focused and color-balanced with respect to the reference scene object based on the reference image data, thereby defining a reference smaller-wavelength focal plane and a reference larger-wavelength focal plane based at least on a reference distance of the reference scene object away from the lens.

12. The method of claim 11, further comprising:
identifying a present calibration configuration associated with directing the automatic configuration, the present calibration condition corresponding to one of a predetermined plurality of calibration conditions,
wherein determining the target object distance comprises associating the MCR ratio with the target object distance in accordance with a pre-calibrated correlation associated with the present calibration configuration.

13. The method of claim 12, wherein:
each of the plurality of calibration conditions is associated with a respective set of pre-calibrated parameter values for a shared set of parameters;
the pre-calibrated correlation is defined at least partially as a function of the shared set of parameters; and
determining the target object distance comprises computing the pre-calibrated correlation as a function of the respective set of pre-calibrated parameter values associated with the present calibration configuration.

14. The method of claim 12, wherein determining the target object distance comprises:
retrieving one of a respective plurality of mappings associated with the present calibration in a lookup table, the lookup table defining, for each of the plurality of calibration conditions, a respective plurality of mappings between a plurality of calibrated MCR ratios and a plurality of calibrated object distances;
identifying one of the plurality of calibrated MCR ratios as corresponding to the MCR ratio; and
mapping the one of the plurality of calibrated MCR ratios to one of the plurality of calibrated object distances according to the one of the respective plurality of mappings associated with the present calibration in the lookup table.

15. The method of claim 10, further comprising:
generating a two-dimensional output image, concurrent with computing the first MCR and the second MCR and with determining the target object distance, by processing the raw image data to correct color misalignment in the raw image data.

16. The method of claim 10,
wherein the received light comprises light reflected off of a plurality of scene objects comprising the target scene object,
wherein, for each of the plurality of scene objects, a respective portion of the smaller-wavelength component of the received light is focused to a respective smaller-wavelength focal plane corresponding to a respective object distance of the scene object away from the lens, and a respective portion of the larger-wavelength component of the received light is focused to a respective larger-wavelength focal plane corresponding to the respective object distance of the scene object, and
further comprising:
computing, for each scene object, a respective first MCR from the first set of chromatic responses and a respective second MCR from the second set of chromatic responses;
determining, for each scene object, the respective object distance of the scene object based on a respective ratio between the respective first MCR and the respective second MCR; and
generate a depth map for a scene comprising the plurality of scene objects, the depth map indicating the respective object distances of the plurality of scene objects.

17. The method of claim 10, further comprising, prior to the receiving:

projecting illumination to produce one or more detection edge features in a field of view of the image sensor, wherein the target scene object is one of the detection edge features.

18. A system for passive three-dimensional imaging, the system comprising:

one or more processors; and non-transient memory having instructions stored thereon, which, when executed by the one or more processors, cause the one or more processors to perform steps comprising:

receiving raw image data from an image sensor indicating a first set of chromatic responses and a second set of chromatic responses responsive to received light reflected off of a target scene object and focused by a lens onto the image sensor, such that a smaller-wavelength component of the received light is focused according to a target smaller-wavelength focal plane, and a larger-wavelength component of the received light is focused according to a target larger-wavelength focal plane, the first set of chromatic responses produced by the image sensor responsive the smaller-wavelength component of the received light, the second set of chromatic responses produced by the image sensor responsive to the larger-wavelength component of the received light;

computing a first magnitude of chromatic response (MCR) from the first set of chromatic responses;

computing a second MCR from the second set of chromatic responses;

computing a MCR ratio as between the first MCR and the second MCR; and determining a target object distance of the target scene object away from the lens based on the MCR ratio.

19. The system of claim 18, wherein the steps further comprise, prior to computing the first MCR and the second MCR:

receiving reference image data from the image sensor responsive to light reflected off of a reference scene object and focused through the lens, the reference scene object being different from the target scene object; and directing automatic configuration of the image sensor and the lens to be focused and color-balanced with respect to the reference scene object based on the reference image data, thereby defining a reference smaller-wavelength focal plane and a reference larger-wavelength focal plane based at least on a reference distance of the reference scene object away from the lens.

20. The system of claim 19, wherein the steps further comprise:

identifying a present calibration configuration associated with directing the automatic configuration, the present calibration condition corresponding to one of a predetermined plurality of calibration conditions, wherein determining the target object distance comprises associating the MCR ratio with the target object distance in accordance with a pre-calibrated correlation associated with the present calibration configuration.

* * * * *